United States Patent
Ficken

(10) Patent No.: US 11,583,915 B2
(45) Date of Patent: Feb. 21, 2023

(54) HOSE CRIMPING ASSEMBLY

(71) Applicant: STERIS INSTRUMENT MANAGEMENT SERVICES, INC., Birmingham, AL (US)

(72) Inventor: Adam Ficken, Auburn, AL (US)

(73) Assignee: STERIS Instrument Management Services, Inc., Birmingham, AL (US)

(*) Notice: Subject to any disclaimer, the term of this patent is extended or adjusted under 35 U.S.C. 154(b) by 33 days.

(21) Appl. No.: 16/395,964

(22) Filed: Apr. 26, 2019

(65) Prior Publication Data
US 2020/0338620 A1     Oct. 29, 2020

(51) Int. Cl.
  *B21D 39/04*   (2006.01)
  *F16L 33/207*  (2006.01)
  *B25B 27/10*   (2006.01)

(52) U.S. Cl.
  CPC .......... B21D 39/048 (2013.01); F16L 33/207 (2013.01)

(58) Field of Classification Search
  CPC ........ B21D 39/04; B21D 39/048; B25B 27/10
  See application file for complete search history.

(56) References Cited

U.S. PATENT DOCUMENTS

| | | | |
|---|---|---|---|
| 2,314,236 A * | 3/1943 | Mott | F16L 33/2076 |
| | | | 285/259 |
| 4,038,011 A | 7/1977 | Lemelson | |
| 4,277,879 A * | 7/1981 | Ridenour | F16L 13/141 |
| | | | 29/516 |
| 4,305,608 A | 12/1981 | Stuemky et al. | |
| 4,330,142 A * | 5/1982 | Paini | B21D 39/04 |
| | | | 285/259 |
| 4,429,018 A | 1/1984 | Stuemky | |
| 4,649,616 A | 3/1987 | Bricker et al. | |

(Continued)

FOREIGN PATENT DOCUMENTS

| | | |
|---|---|---|
| DE | 10343837 B3 | 6/2005 |
| DE | 10343837 | 11/2018 |

(Continued)

OTHER PUBLICATIONS

Wesco; Hydraulic Crimping Die CU K-840; Nov. 27, 2018; p. 1; https://buy.wesco.com/Crimping-Dies/HUSKIE-TOOLS/Hydraulic-Crimping-Die-CU-K-840/HT41AE/p/78981998927-1.

(Continued)

*Primary Examiner* — Shelley M Self
*Assistant Examiner* — Mohammed S. Alawadi
(74) *Attorney, Agent, or Firm* — C. Brandon Browning; Ilya S. Mirov; Maynard, Cooper & Gale, PC

(57) ABSTRACT

A crimping method including providing a coupling including a sidewall and a ribbed stem having a plurality of radial valleys, the ribbed stem defining a longitudinal axis, wherein the first sidewall extends radially to the axis, and providing a die including a stop and a channel extending through the stop, the channel having a ribbed section with a plurality of ribs. The ribbed stem is inserted through the first stop, into the first channel and into the end of a hose. With a ferrule arranged between the ribbed section and the hose and the sidewall pressed against the stop, the die is used to compress the end of the hose between the ferrule and the ribbed stem with the plurality of radial valleys radially aligned with the plurality of ribs. The couplings are selected from a medical gas medical gas outlet rough-in and a medical gas nut nipple.

20 Claims, 11 Drawing Sheets

(56) References Cited

U.S. PATENT DOCUMENTS

| | | | | |
|---|---|---|---|---|
| 4,804,212 | A | * | 2/1989 | Vyse ................... B21D 39/04 |
| | | | | 285/259 |
| 5,257,525 | A | * | 11/1993 | Clarke ................ B21D 39/046 |
| | | | | 29/237 |
| 5,285,561 | A | | 2/1994 | Manning et al. |
| 5,797,629 | A | | 8/1998 | Beagle |
| 6,324,884 | B1 | * | 12/2001 | Barjesteh ............ B21D 39/046 |
| | | | | 29/237 |
| 6,395,222 | B1 | | 5/2002 | Van Meerveld et al. |
| 6,792,789 | B1 | * | 9/2004 | Faucher ............. B21D 39/048 |
| | | | | 72/409.16 |
| 7,347,457 | B2 | | 3/2008 | Wulf et al. |
| 8,220,306 | B2 | | 7/2012 | Van Essen |
| 9,476,529 | B2 | | 10/2016 | Kury |
| 9,502,786 | B2 | | 11/2016 | Wang et al. |

FOREIGN PATENT DOCUMENTS

| | | | |
|---|---|---|---|
| GB | 1325967 | A | 8/1973 |
| WO | WO2000061985 | A2 | 10/2000 |

OTHER PUBLICATIONS

22 Top Ferrule Crimping Tools, www.bestofpowerhandtools.com, Feb. 12, 2017.

* cited by examiner

HOSE CRIMPING ASSEMBLY

FIELD OF USE

The present application is directed to hose crimping dies and, more particularly, to a medical hose crimping assembly for attaching a hose to and between a medical gas outlet rough-in and a medical gas nut nipple with the radial valleys or troughs formed by respective ribbed stems of the medical gas outlet rough-in and the medical gas nut nipple being precisely aligned with radial ribs of the hose crimping dies.

BACKGROUND OF THE INVENTION

Medical hose assemblies are used to deliver fluids especially gases, such as oxygen and nitrous oxide, or as vacuum hoses. In certain instances, these hose assemblies include a hose coupled to a valve body, which is a source of a gas or vacuum, and/or a nut nipple, which is used to couple the hose to an apparatus to which the gas or vacuum is to be delivered. A ferrule, i.e., a metal sleeve, is crimped about an end of the hose using a die assembly and a manual or pneumatic crimping tool, while a stem of the valve body or nut nipple is positioned within the end of the hose thereby operatively attaching the hose to the valve body or nut nipple. To improve the quality of the crimp, the die assembly includes inwardly extending, radial protrusions or ribs and the stem includes a roughened section characterized by outwardly extending, radial projections or ribs that forms grooves or valleys that are complementary with the inwardly extending, radial protrusions or ribs of the die assembly.

An exemplary hose assembly is described in U.S. Pat. No. 4,330,142, which discloses a serviceable-type hose coupling for a tube including a tubular nipple end on the tube over which a section of hose fits, the nipple having a plurality of parallel segmented circumferential alternate larger and smaller diameter portions, the portions having connecting walls diverging outwardly at an angle between about 50° and 70° from the smaller diameter portions. A plurality of at least three equally angularly spaced axially extending rows of outward projections, at least one projection extending from each of the larger diameter portions. A radially outwardly extending circumferential flange bead is provided at the inner end of the nipple. A compressible hose snugly fits over said nipple and against the bead. A ferrule fits over the hose and has a radial end flange against the end of the hose and abuts against said bead of the nipple, the ferrule being radially inwardly compressed around the hose to urge the hose against the larger and smaller diameter portions of the nipple and to urge the hose axially against the inside of the flange of the ferrule which in turn is urged against the bead to form a seal to protect the end of the hose.

U.S. Pat. No. 5,797,629 discloses a hose coupling having a nipple with an internal insertion tube and a collar coaxially disposed around the insertion tube in spaced relation thereto to form an annular space for receiving an end of a hose. The hose coupling includes an array of crimps in the collar, wherein each crimp is spaced both axially and circumferentially from adjacent crimps to deform the collar into the hose and to hold the hose in engagement with the insertion tube. The array of crimps are arranged with first and second alternating lines of three crimps each, wherein each of the crimps in the lines of crimps is longitudinally spaced from the adjacent crimps and wherein the crimps of the first line of crimps are staggered with respect to the crimps of the second line of crimps. In each line there is a relatively long crimp and two relatively short crimps with the long crimp being at an end of the line with the ends of alternating crimps lines having a long crimp proceeding the short crimps in the first lines and the long crimps trailing the short crimps in the second lines.

A shortcoming of current medical hose assemblies is their reliance upon die assemblies that require crimping tool operators, whether the tools are manually operated or powered, to estimate optimum placement of the valve body stems and nut nipple stems inside of the die assemblies during crimping. Optimum placement occurs when the ribs of the die assembly are radially aligned with valleys or grooves formed between the ribs or projections of the valve body stem or nut nipple stem. If optimum placement of the valve body stems and nut nipple stems inside of the die assemblies does not occur during crimping, the hose can be cut or pinched between the respective ribs of the dies and the stems. When this occur, the hose may overtime lose gas and pressure through cuts or holes formed through the hose in the area of the crimp.

SUMMARY OF THE INVENTION

The present invention is directed to a crimping assembly and method of using same for attaching couplings to the ends of medical gas hoses. The couplings may be medical gas outlet rough-ins and medical gas nut nipples. According to one aspect of the invention there is provided a crimping assembly for coupling a medical gas outlet rough-in to a first end of a hose and a medical gas nut nipple to a second end of the hose. The medical gas outlet rough-in includes a base and a stem extending radially out from and fluidly coupled with the base, the stem including first ribbed section having a plurality of first radial valleys defined between first radial ribs. The medical gas nut nipple includes a nut portion and a second ribbed section extending axially from the nut portion, the second ribbed section having a plurality of second radial valleys defined between second radial ribs. The crimping assembly includes a first die and a second die. The first die is configured for coupling the medical gas outlet rough-in to a first end of the hose and includes a first stop and a first channel extending through the first stop, the first channel having a first diameter and a first ribbed section including a plurality of first ribs, each of the first ribs including a first rib height. The second die is configured for coupling the medical gas nut nipple to a second end of the hose and includes a second stop and a second channel extending through the second stop, the second channel having a second diameter and a second ribbed section including a plurality of second ribs, each of the second ribs including a second rib height.

In use, when the stem of the medical gas outlet rough-in is fully inserted through the first stop and into the first channel of the first die, the first stop directly contacts the base and the plurality of first ribs of the first die are radially aligned with the plurality of first radial valleys of the stem of the medical gas outlet rough-in. Similarly, when the second ribbed section of the medical gas nut nipple is fully inserted through the second stop and into the second channel of the second die, the second stop directly contacts the nut portion and the plurality of second ribs of the second die are radially aligned with the plurality of second radial valleys of the second ribbed section. Arranged in this manner, a hose may be coupled to and between the medical gas outlet rough-in and the medical gas nut nipple using a ferrule a optimally formed crimps.

According to one embodiment of the assembly, the first channel includes a diameter that is the same as a diameter of the second channel and the first rib height is the same as the second rib height. According to another embodiment of the assembly, the nut nipple has a third stop opposite the second stop such that when the second ribbed section of the medical gas nut nipple is fully inserted through the third stop and into the second channel of the second die, the third stop directly contacts the nut portion with the plurality of second ribs of the second die being radially aligned with the plurality of second radial valleys of the second ribbed section. According to yet another embodiment of the assembly, the first die is operatively seated within a battery powered, hand-held crimping tool.

According to another aspect of the invention, there is provided a crimping assembly for attaching a first coupling to a first end of a hose and a second coupling to a second end of the hose. The first coupling includes a stem extending radially out from a base, the stem including first ribbed section having a plurality of first radial valleys defined between first radial ribs. The second coupling includes a nut portion and a second ribbed section extending from the nut portion, the second ribbed section having a plurality of second radial valleys defined between second radial ribs. The crimping assembly includes a first die having a first stop and a first channel, the first channel having a first ribbed section including a plurality of first ribs, and a second die including a second stop and a second channel, the second channel having a second ribbed section including a plurality of second ribs, each of the second ribs.

In use, when the stem of the first coupling is fully inserted through the first stop and into the first channel of the first die, the first stop directly contacts the base with the plurality of first ribs of the first die being radially aligned with the plurality of first radial valleys of the stem. When the second ribbed section of the second coupling is fully inserted through the second stop and into the second channel of the second die, the second stop directly contacts the nut portion with the plurality of second ribs of the second die being radially aligned with the plurality of second radial valleys of the second ribbed section.

According to yet another aspect of the invention, there is provided. a method for attaching couplings to a hose, the method including providing a first coupling including a first sidewall and a first ribbed stem having a plurality of radial first valleys defined between radial first ribs, the first ribbed stem defining a first longitudinal axis, wherein the first sidewall extends radially to the first longitudinal axis, and providing a first die configured for attaching the first coupling to a first end of the hose, the first die including a first stop and a first channel extending through the first stop, the first channel having a first ribbed section including a plurality of first ribs. The first ribbed stem is inserted through the first stop, into the first channel and into the first end of the hose. With a first ferrule arranged between the first end of the hose and the first ribbed section and the first sidewall pressed against the first stop, the first die is used to compress the first end of the hose between the first ferrule and the first ribbed stem with the plurality of radial first valleys being radially aligned with the plurality of first ribs.

According to one embodiment of the method, the method further include providing a second coupling including a second sidewall and a second ribbed stem having a plurality of radial second valleys defined between radial second ribs, the second ribbed stem defining a second longitudinal axis, wherein the second sidewall extends radially to the second longitudinal axis, and providing a second die configured for attaching the second coupling to a second end of the hose, the second die including a second stop and a second channel extending through the second stop, the second channel having a second ribbed section including a plurality of second ribs. The second ribbed stem is inserted through second stop, into second first channel, and into the second end of the hose. A second ferrule is arranged between the second ribbed stem and second ribbed section. While the second sidewall is pressed against the second stop, the second die is sued to compress the second end of the hose between the second ferrule and the second ribbed stem with the plurality of radial second valleys being radially aligned with the plurality of second ribs.

According to another embodiment of the method, the first coupling is a medical gas outlet rough-in and the second coupling is a medical gas nut nipple. According to another embodiment of the method, the method includes placing the first die in a powered, hand-held crimping tool and causing the crimping tool to compress the first end of the hose between the first ferrule and the first ribbed stem. According to another embodiment of the method, the method includes removing the first die from the powered, hand-held crimping tool and placing the second die in the powered, hand-held crimping tool and causing the crimping tool to compress the second end of the hose between the second ferrule and the second ribbed stem. In another embodiment, the first die is operatively seated within a powered crimping tool that is supported on a rotatable platform when the first die is used to compress the first end of the hose between the first ferrule and the first ribbed stem. In another embodiment, the method includes providing a first powered crimping tool and a second powered crimping tool, supporting the first powered crimping tool and the second powered crimping tool on a rotatable platform, operatively seating the first die in the first powered crimping tool and the second die in the second powered crimping tool, wherein the first die is configured for coupling a medical gas outlet rough-in to the first end of the hose and the second die is configured for coupling a medical gas nut nipple to the second end of the hose.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present invention is directed to a medical gas hose crimping assembly for operatively coupling a medical gas hose to and between a source of gas, such as a medical gas outlet rough-in, and medical gas nut nipple. FIGS. 1 through 10 depict a first die assembly 100 of the medical gas hose crimping assembly for coupling a medical gas hose to a medical gas outlet rough-in. FIGS. 11 through 18 depict a second die assembly 200 of the medical gas hose crimping assembly configured for coupling the medical gas hose to a medical gas nut nipple. FIG. 19 depicts a platform 300 for supporting a plurality of the medical gas hose crimping assemblies. The medical gas hose crimping assembly of the present invention generally includes first die assembly 100, second die assembly 200 and one or more battery powered, hand-held hydraulic crimping tools 140. A suitable crimping tool is the 6 Ton Crimper, Li-Ion, Standard, 120V or 230V available from Emerson Electric Co. subsidiary Greenlee, located in Rockford, Ill.

Figure 1:
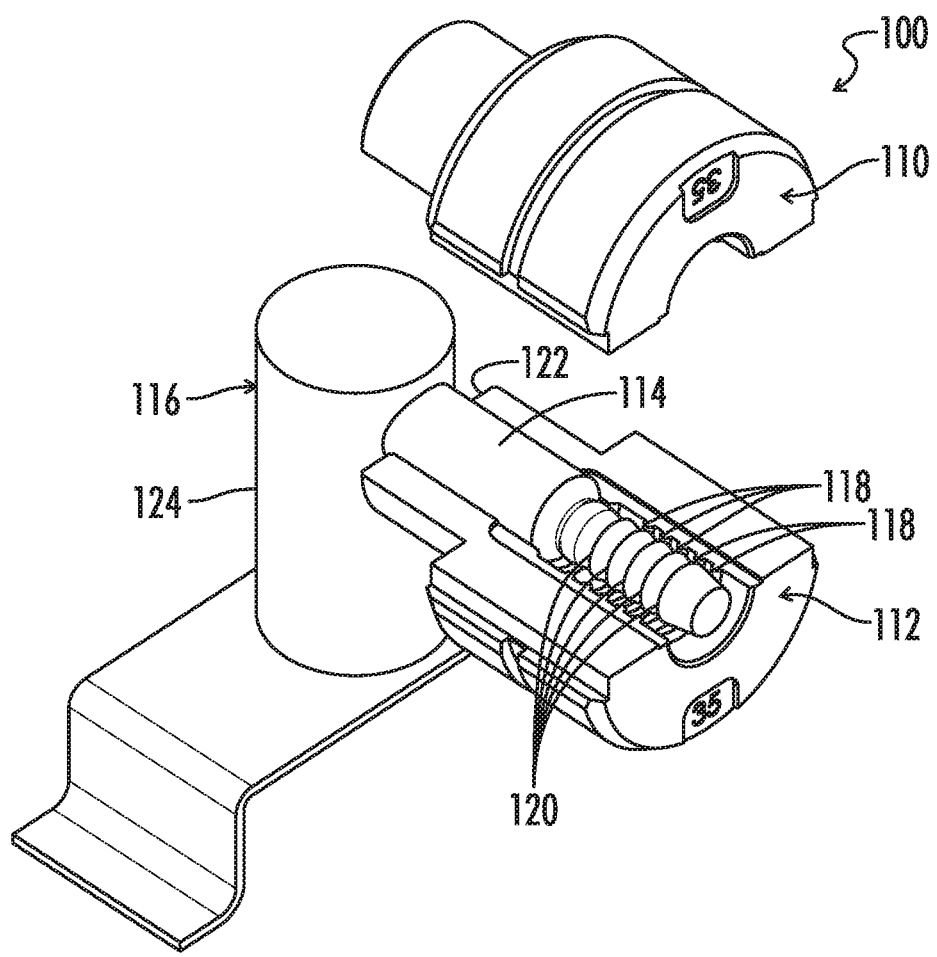
FIG. 1 is a partial, exploded perspective view of a first die assembly and a medical gas outlet rough-in illustrating the arrangement of the first die assembly for coupling a hose to the medical gas outlet rough-in in accordance with the present invention.
Figure 2:
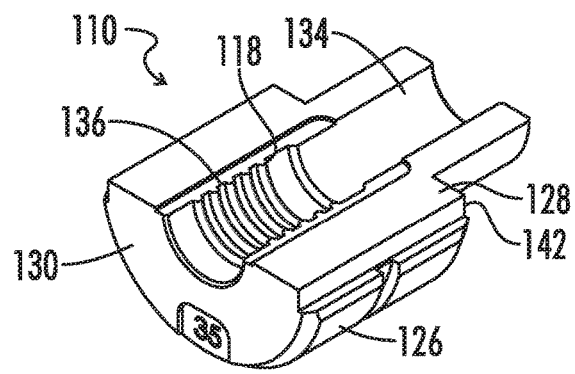
FIG. 2 is a perspective view of a first die of the first die assembly of FIG. 1
Figure 3:
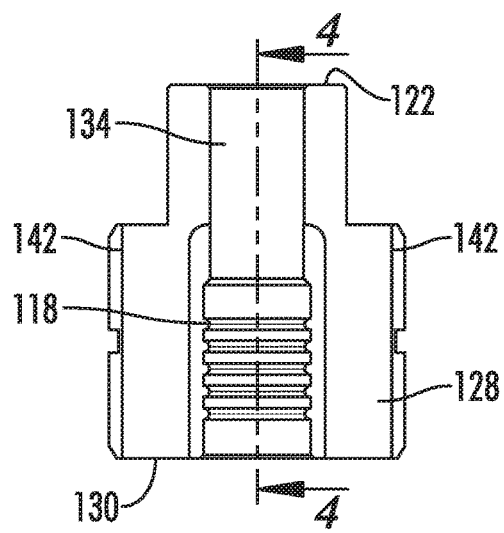
FIG. 3 is a plan view of an inner surface of the first die of FIG. 2.
Figure 4:
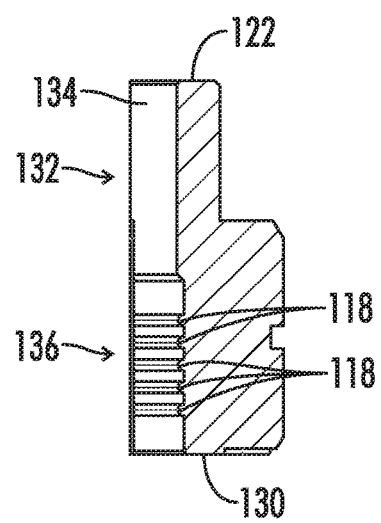
FIG. 4 is sectional view of the first die of FIG. 3 along line A-A.
Figure 5:
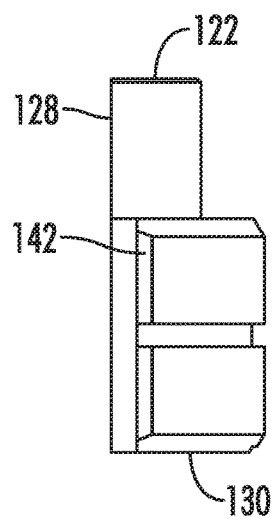
FIG. 5 is an elevational view of a side of the first die of FIG. 2.
Figure 6:
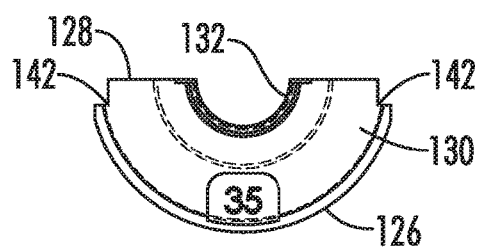
FIG. 6 is an elevational view of an end of the first die of FIG. 1.

Referring to FIG. 1, first die assembly 100 includes a pair of first dies portions 110, 112, which are mirror images of one another. First die assembly 100 is configured to receive a stem 114 of a medical gas outlet rough-in 116 between first die portions 110, 112, precisely align a plurality of inwardly extending radial ribs 118 of first die portions 110, 112 with radial valleys or grooves formed between a plurality of outwardly extending radial ribs 118 of stem 114 of medical gas outlet rough-in 116, and compress or crimp a ferrule about an end of a hose that is inserted over stem 114 and between the ferrule and first die portion 110, 112.

Precise alignment of radial ribs 118 of first die portions 110, 112 with the radial grooves formed between radial ribs 118 of stem 114 is accomplished in part by arranging radial ribs 118 relative to one another within first die portion 110, 120 so that a tip of each rib 118 can be radially aligned with a bottom of a complimentary groove formed between radial ribs 120 of stem 114. Thus, the spacing between adjacent tips of radial ribs 118 is the same as or complimentary to the spacing between the bottoms of the grooves formed between adjacent radial ribs 120 of stem 114.

Placement of stem 114 within first die assembly 100 with each tip of ribs 118 of first die portion 110, 112 radially aligned with a bottom of a complimentary groove formed between radial ribs 120 of stem 114 is accomplished by providing each of first die portions 110, 112 with a stop 122. Stop 122 is a die end wall through which stem 114 is inserted for crimping that limits the distance into a channel defined between first die portions 110, 112 through which stem 14 may pass. When stop 112 is pressed against base 124 of medical gas outlet rough-in 116, each tip of ribs 118 of first die portion 110, 112 is radially aligned with a bottom of a complimentary groove formed between radial ribs 120 of stem 114. Thus, the distance between stop 122 and the tip of the rib 118 nearest stop 122 is equal to the distance between the intersection of base 124 with stem 114 and the bottom of the groove between radial ribs 120 nearest to base 124.

Referring to FIGS. 2 through 6, first die portions 110, 120 are each formed from an elongate, solid metal block having a substantially semi-circular cross-section. First die portions 110, 112 include a curved or semicircular outer face 126, a planar inner face 128, an end wall or stop 122, an opposing end wall 130 and a semi-circular channel 132 formed in inner face 128 extending to and between stop 122 and end wall 130. Channel 132 includes a smooth neck portion 134 extending from stop 122 towards end wall 130. Neck portion 134 has a diameter that is the same as or slightly greater than a diameter of a section of stem 114 proximal to radial ribs 118. Distal to neck portion is crimping portion 136. Crimping portion includes radial ribs 118 and has a diameter that is greater than a diameter of neck portion 134.

Figure 7:
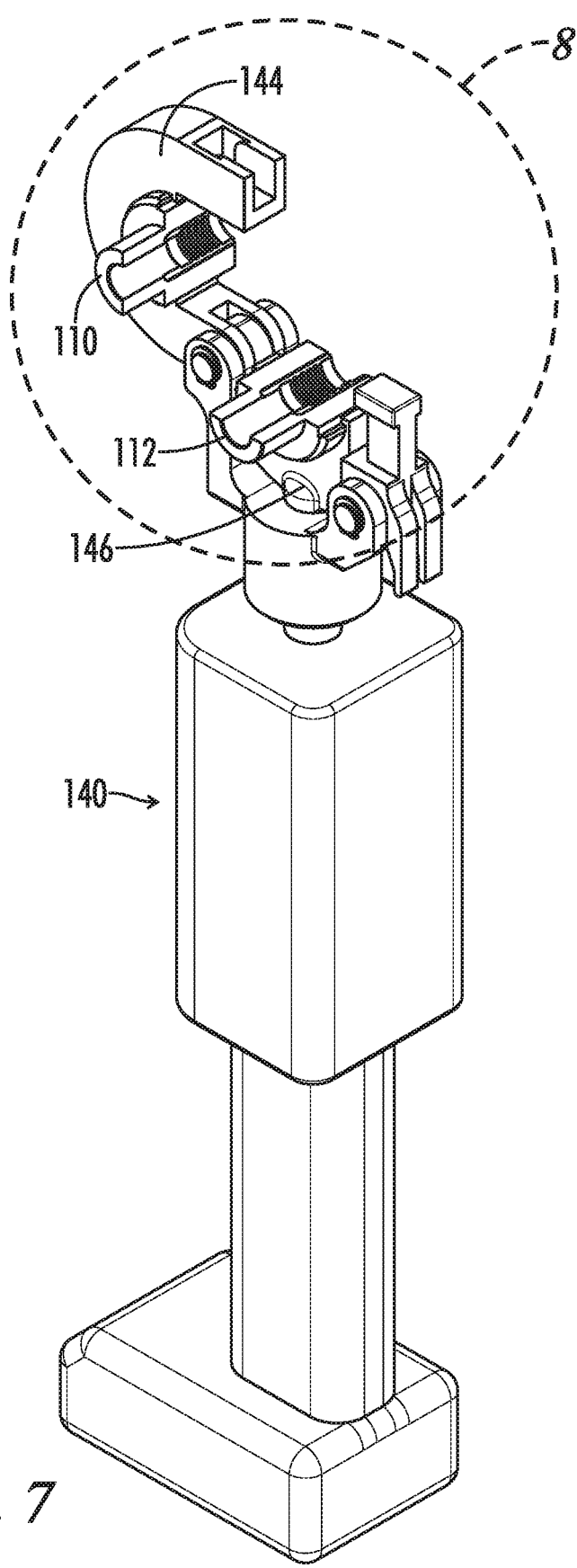
FIG. 7 is a perspective view of the first die assembly of FIG. 1 operatively seated in a powered crimping tool.
Figure 8:
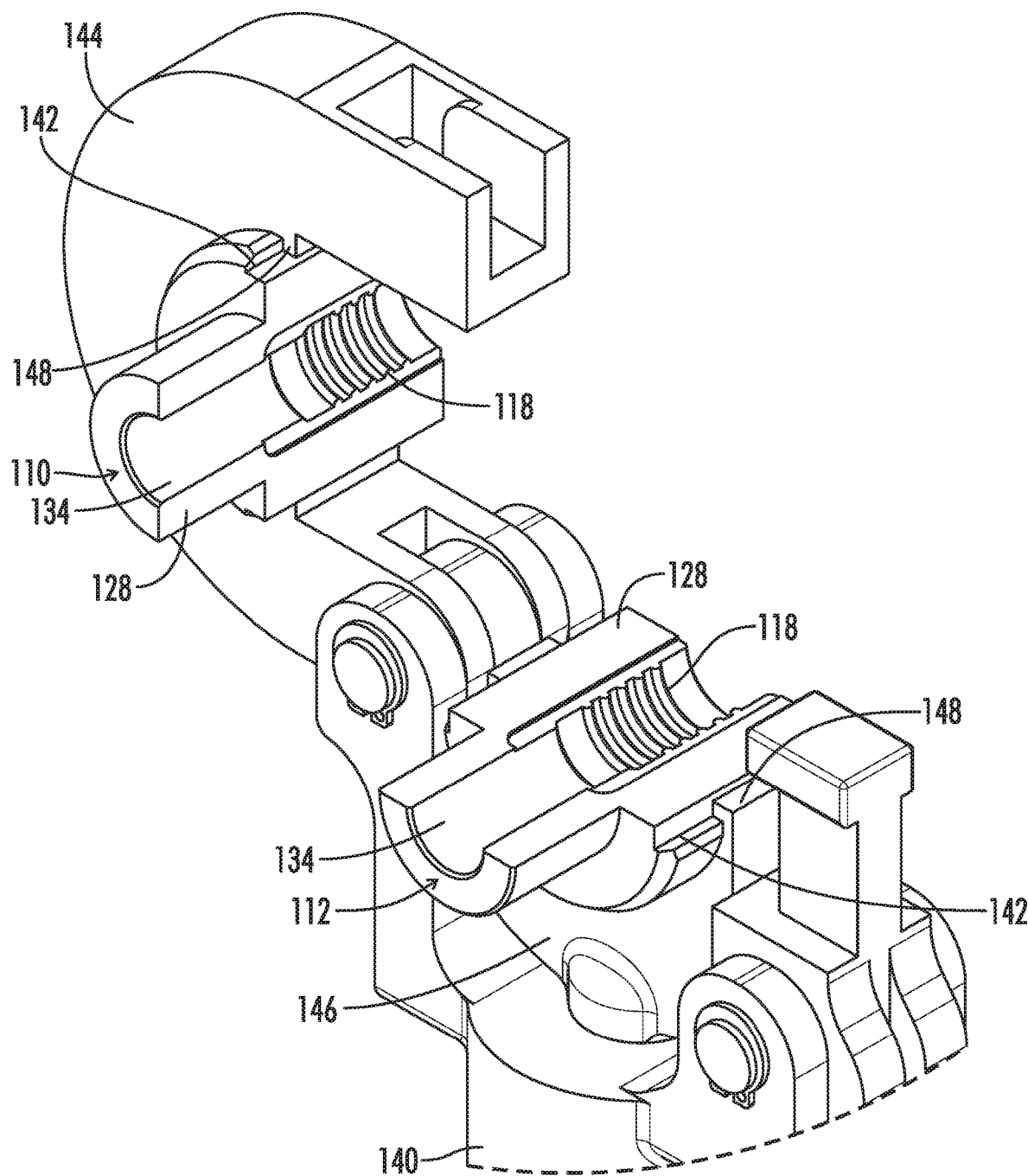
FIG. 8 is a perspective view of the first die assembly of FIG. 7 at detail F.

Referring to FIGS. 7 and 8, first die portions 110, 120 are configured for being removably seated within powered, hydraulic, hand-held crimping tool 140. More particularly, crimping tool 140 includes an upper jaw 144 for supporting first die portion 100 and a lower jaw 146 for supporting first die portion 112. Each jaw 144, 146 includes a pair of opposing locking arms 148. Locking arms 148 are configured to be received within opposing slots 142 formed within outer face 126 of each of first die portions 110, 112 along the intersection of outer face 126 and inner face 128. First die portions 110, 112 are quickly and easily removed from and seated within jaws 144, 146 by siding arms 148 along slots 142.

Figure 9:
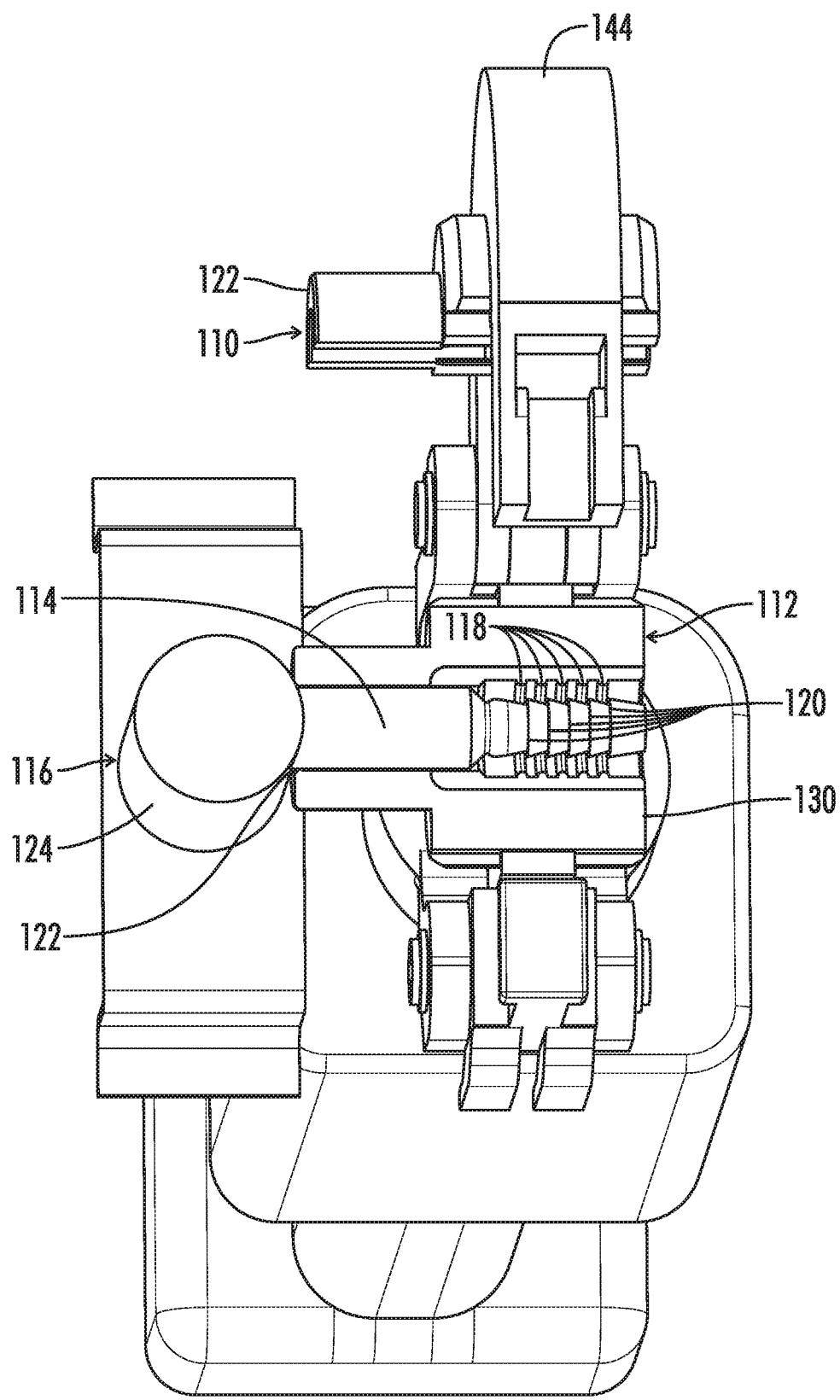
FIG. 9 is a perspective view illustrating the arrangement of the first die assembly and the medical gas outlet rough-in of FIG. 1 operatively seated within the crimping tool of FIG. 7.

Referring to FIG. 9, with first die portions 110, 112 of the die assembly 100 operatively coupled to the crimping tool 140, medical gas outlet rough-in 116 is received within first die portion 112 with stem 114 of medical gas outlet rough-in 116 extending through stop 122 and into channel 132 of inner face 128. When stop 122 is pressed against base 124, each tip of ribs 118 of first die portion 112 is radially aligned with a bottom of a complimentary groove formed between radial ribs 120 of stem 114.

Figure 10:
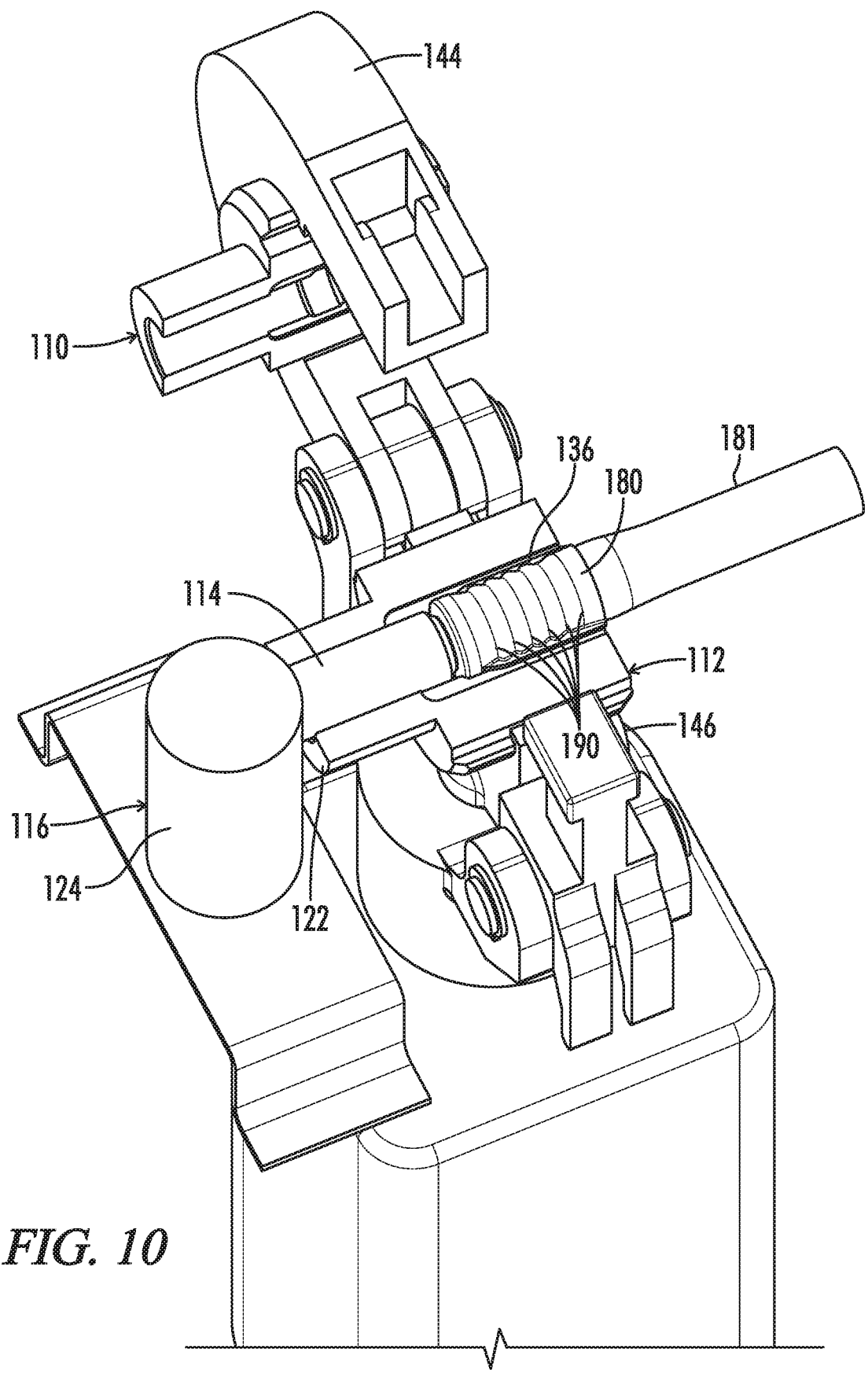
FIG. 10 is a perspective view of a ferrule crimped about a hose and a ribbed stem of the medical gas outlet rough-in using the first die assembly and crimping tool of FIG. 9.
Figure 11:
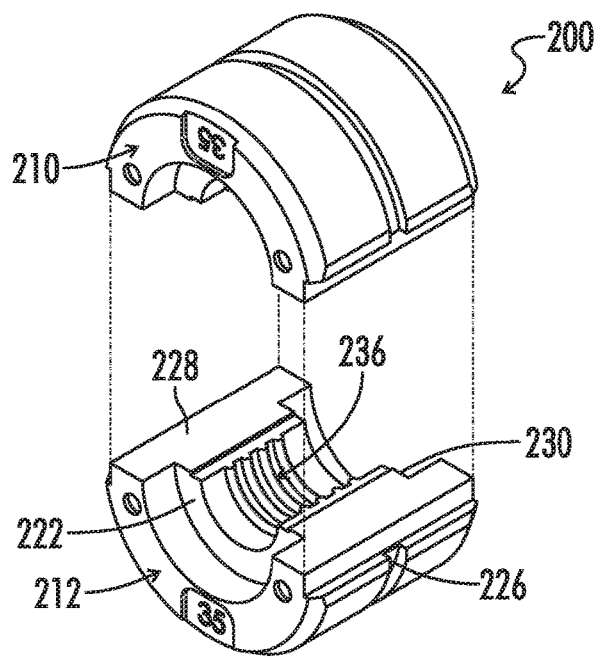
FIG. 11 is a perspective view of a second die assembly for coupling a hose to a medical gas nut nipple in accordance with the present invention.
Figure 12:
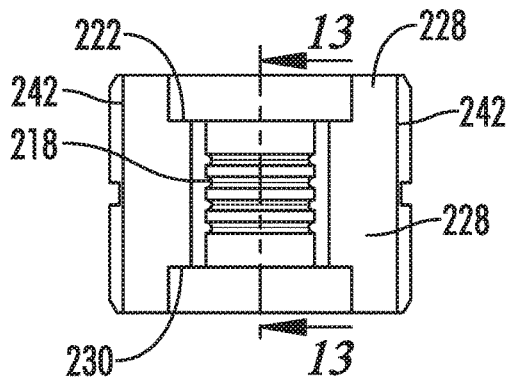
FIG. 12 is a plan view of an inner surface of a second die of the second die assembly of FIG. 11.
Figure 13:
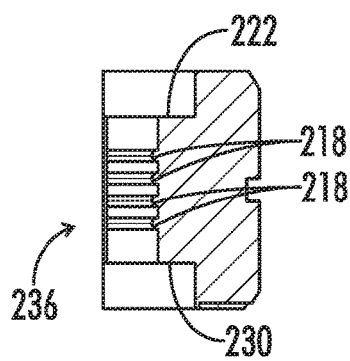
FIG. 13 is sectional view of the second die of FIG. 12 along line L-L.
Figure 14:
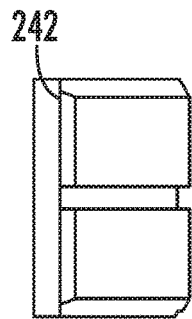
FIG. 14 is an elevational view of a side of the second die of FIG. 11.
Figure 15:
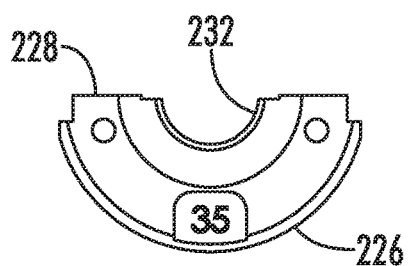
FIG. 15 is an elevational view of an end of the second die of FIG. 11.

Referring to FIG. 10, with medical gas outlet rough-in operatively seated within first die portion 112, a ferrule 180 is fitted over a first end of hose 181 and the ferrule and the first end of hose 181 are inserted together over ribs 120 of stem 114. Upper jaw 144 and first die portion 110 are then pivoted downward toward lower jaw 146 and first die portion 112, and upper jaw 144 is locked against a body of crimping tool 140. With ferrule 180 and the first end of hose 181 arranged between crimping section 136 of first die portions 110, 112 and ribs 120 of stem 114, crimping tool 140 is actuated causing lower jaw 146 to translate upwards towards upper jaw 144 thereby compressing and crimping ferrule 180 about the first end of hose 180 and ribs 120 of stem 14. As a result, a plurality of circumferential grooves 190 are formed, corresponding to ribs 118, over the surface of ferrule 180 due to compression, indicating crimping through the length of ferrule 180. Following crimping of ferrule 180, lower jaw 146 is retracted and upper jaw 144 pivoted upwards to release the first end of hose 181 from the die assembly.

Referring to FIGS. 11 through 15, second die assembly 200 includes a pair of second die portions 210, 212, which are mirror images of one another. Second die assembly 200 is configured to receive a ribbed stem 214 of a medical gas nut-nipple 216 between second die portions 210, 212, as will be described later. Second die portions 210, 212 are each formed from an elongate, solid metal block having a substantially semi-circular cross-section. Second die portions 210, 212 include a curved or semicircular outer face 226, a planar inner face 228, an end wall or stop 222, an opposing end wall or opposing stop 230, a semi-circular channel 232 formed in inner face 228 extending to and between stop 222 and opposing stop 230, a crimping portion 236 including radial ribs 218.

In an exemplary embodiment, an inner diameter of die assembly 200 and an inner diameter of die assembly 100 may be same. Further, a height of ribs 218 of die assembly 200 and a height of ribs 118 of die assembly 100 may be same. Furthermore, a length of crimping portion 236 is same or greater than length of a ferrule 280. In other embodiments, other dimensions of the die assembly 200 may be possible.

Figure 16:
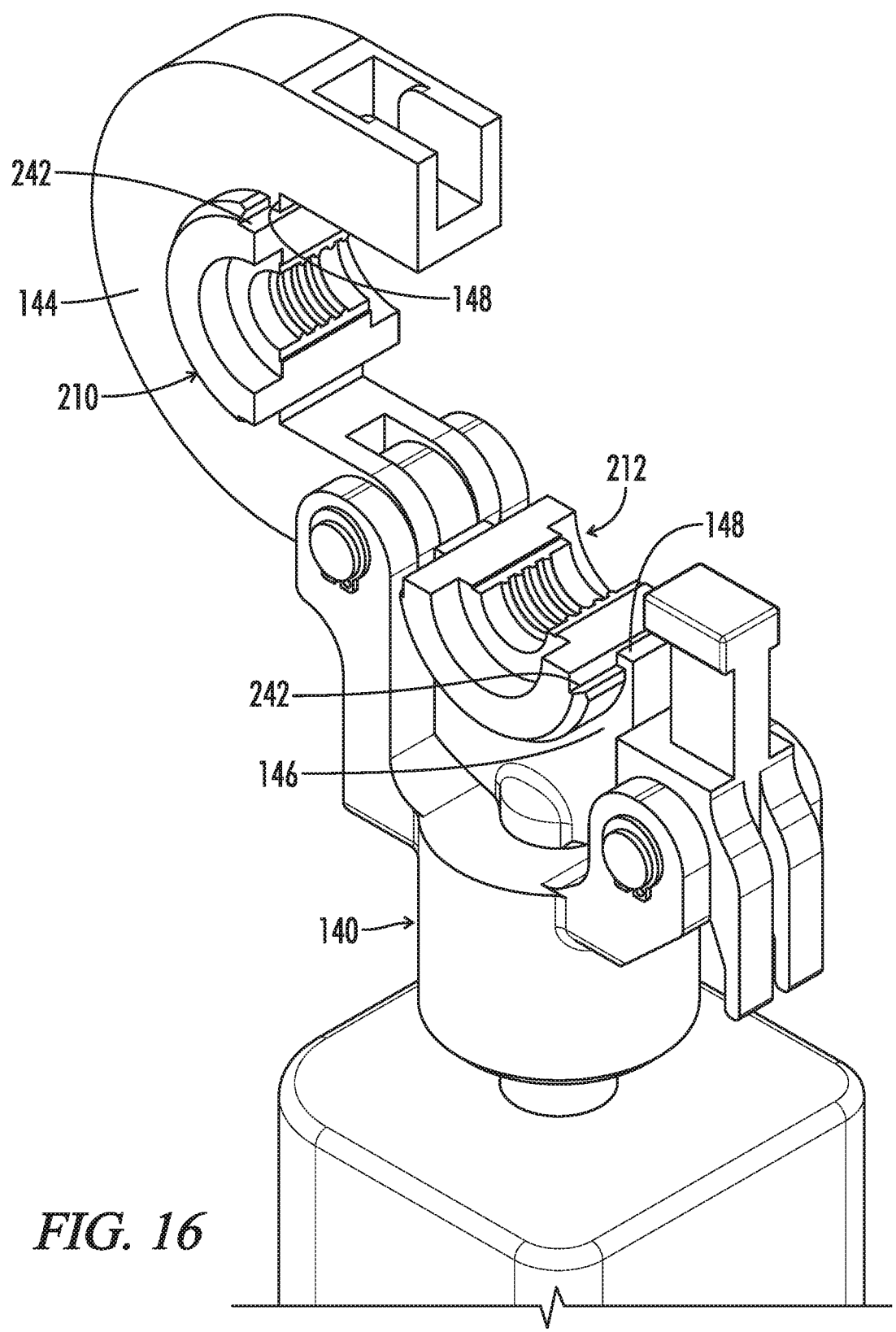
FIG. 16 is a perspective view of the second die assembly of FIG. 11 operatively seated in a powered crimping tool.

Referring to FIG. 16, second die portions 210, 212 of die assembly 200 are operatively coupled to crimping tool 140. As explained above, crimping tool 140 includes upper jaw 144 and lower jaw 146 and a pair of opposing locking arms 148. Locking arms 148 are configured to be received within opposing slots 242 of second die portions 210, 212. Second die portions 210, 212 are quickly and easily removed from and seated within jaws 144, 146 by siding arms 148 along slots 242.

Figure 17:
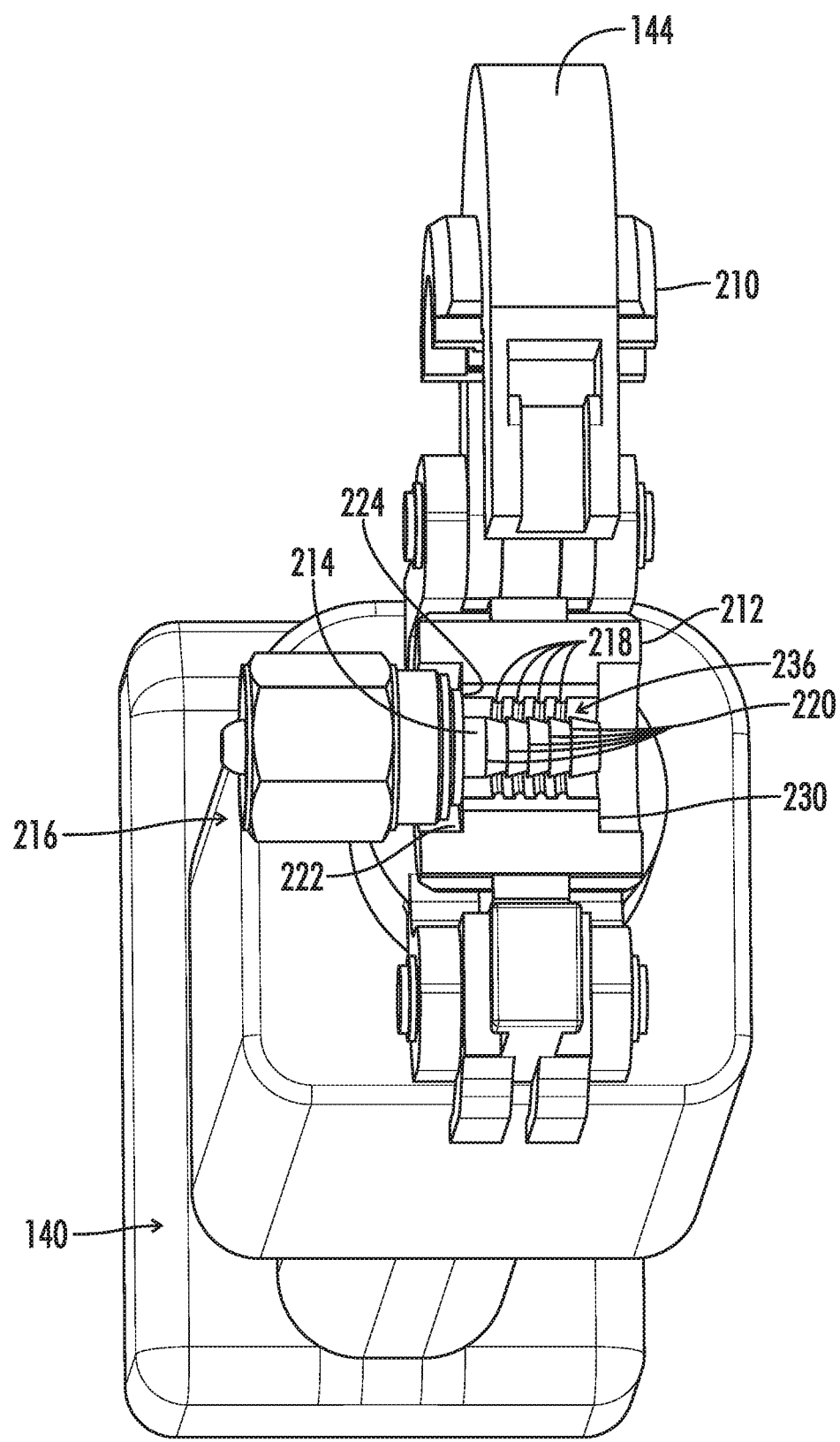
FIG. 17 is a perspective view of the second die assembly and powered crimping tool of FIG. 16 with a medical gas nut nipple operatively seated in the second die.

Referring to FIG. 17, with second die portions 210, 212 of die assembly 200 operatively coupled to crimping tool 140, medical gas nut nipple 216 is received within second die portion 212 with ribbed stem 214 of medical gas nut nipple 216 extending through stop 222 or opposing stop 230 and into channel 232 of the inner face 228. When stop 222 or stop 230 is pressed against a sidewall 224 of the nut portion of nut nipple 226, through which stem 214 extends, each tip of ribs 218 of first die portion 212 is radially aligned with a bottom of a complimentary groove formed between radial ribs 220 of stem 214. As depicted in FIG. 17, sidewall 224 extends radially outward from a longitudinal axis defined by stem 214 and is the distal-most radially extending sidewall of nut nipple 216. It is contemplated that second die portions 210, 212 may be configured with end walls or stops that are arranged to engage sidewalls proximal to stop 222, while maintaining an object of the invention, i.e, optimum alignment of ribs 218 with the groves formed between ribs 220.

Precise alignment of radial ribs 218 of second die portions 210, 212 with the radial grooves formed between radial ribs 220 of the ribbed section 214 is accomplished in part by arranging radial ribs 218 relative to one another within second die portion 210, 212 so that a tip of each rib 218 can be radially aligned with a bottom of a complimentary groove formed between radial ribs 220 of the ribbed section 214.

Thus, the spacing between adjacent tips of radial ribs 218 is the same as or complimentary to the spacing between the bottoms of the grooves formed between adjacent radial ribs 220 of the ribbed section 214.

Placement of the ribbed stem 214 within second die assembly 200 with each tip of ribs 218 of second die portions 210, 212 radially aligned with a bottom of a complimentary groove formed between radial ribs 220 of the ribbed section 214 is accomplished by providing each of second die portions 210, 212 with stop 222 or stop 230. Each of stop 222 and stop 230 is an end wall through which the ribbed section 214 is inserted for crimping that limits the distance into a channel defined between second die portions 210, 212 through which ribbed stem 214 may pass. When stop 222 or opposing stop 230 is pressed against sidewall 224 of medical gas nut nipple 216, each tip of ribs 218 of second die portion 210, 212 is radially aligned with a bottom of a complimentary groove formed between radial ribs 220 of the ribbed stem 214, in crimping portion 236 of the die portions 210, 212. Thus, the distance between stop 222 and stop 230 and the tip of the rib 118 nearest stop 222 and 230, respectively, is equal to the distance between the intersection of sidewall 224 with stem 214 and the bottom of the groove between radial ribs 220 nearest to sidewall 224.

Figure 18:
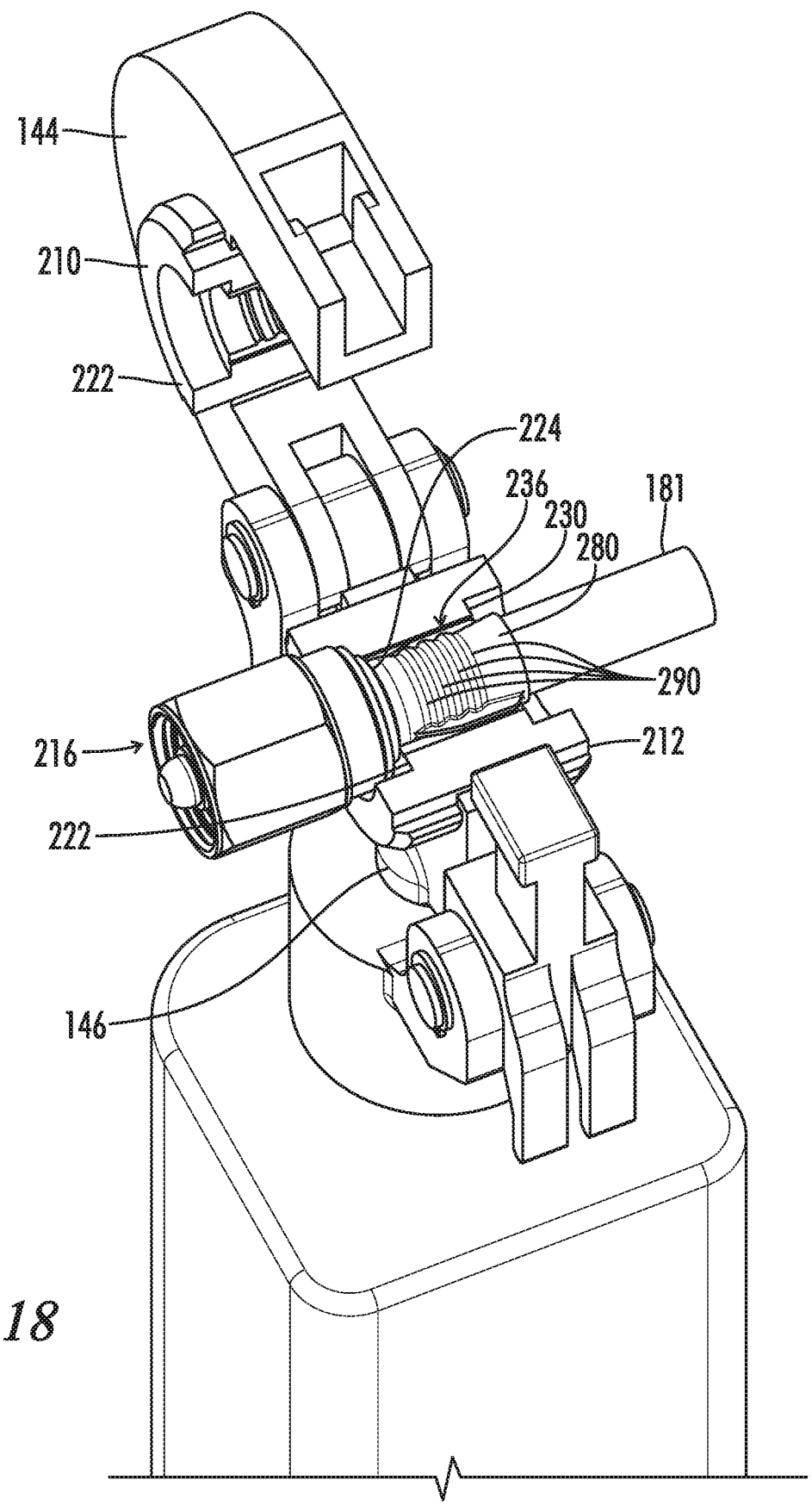
FIG. 18 is a perspective view of a ferrule crimped about a hose and a ribbed stem of the medical gas outlet nut nipple using the second die assembly and crimping tool of FIG. 16.
Figure 19:
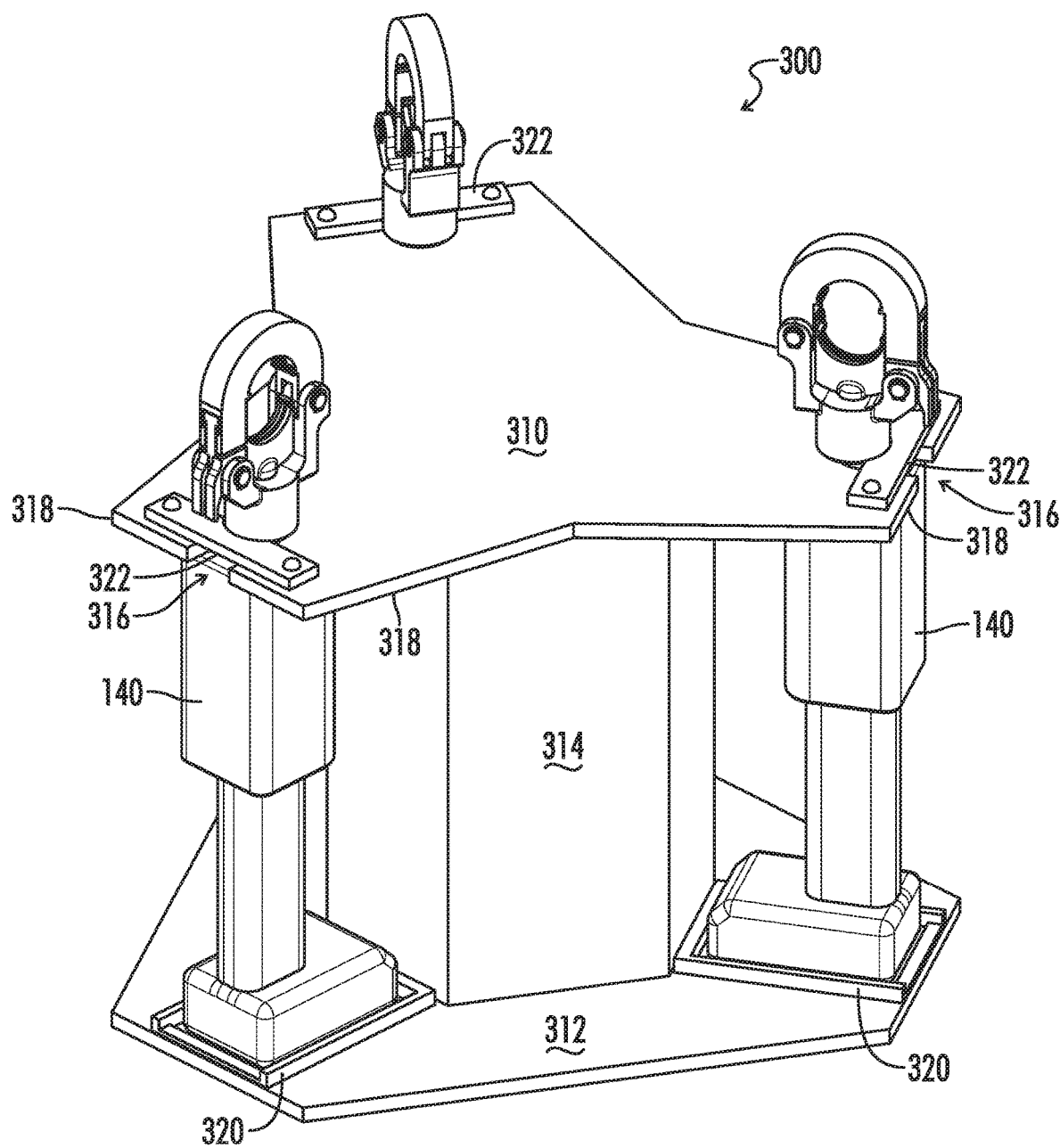
FIG. 19 is a perspective view of a rotatable, platform for supporting powered crimping tools for use with the first die assembly of FIG. 1 and the second die assembly of FIG. 11 in accordance with the present invention.

Referring to FIG. 18, with nut nipple 216 operatively seated within seated die portion 212, a ferrule 280 is fitted over a second end of hose 181 and ferrule 280 and the second end of hose 181 are inserted together over ribs 220 of stem 214. Upper jaw 144 and second die portion 210 are then pivoted downward toward lower jaw 146 and second die portion 212, and upper jaw 144 is locked against a body of crimping tool 140. With ferrule 280 and the second end of hose 181 arranged between crimping sections 236 of second die portions 210, 212 and ribs 220 of stem 214, crimping tool 140 is actuated causing lower jaw 146 to translate upwards towards upper jaw 144 thereby compressing and crimping ferrule 280 about the second end of hose 181 and ribs 220 of stem 214. As a result, a plurality of circumferential grooves 290 are formed, corresponding to ribs 218, over the surface of ferrule 280 due to compression, indicating crimping through the length of ferrule 280. Following crimping of ferrule 280, lower jaw 146 is retracted and upper jaw 144 pivoted upwards to release the first end of hose 281 from the die assembly.

Referring to FIG. 19, there is depicted a rotatable platform 300 for supporting powered crimping tools 140 for use with first die assembly 100 and second die assembly 200. Rotatable platform 300 includes an upper shelf 310, an opposing lower shelf 312 and a base 314 extending vertically to and between the upper and lower shelves. Slots 316 are formed within an edge 118 of upper shelf 310. Each slot 316 is configured for receiving an upper portion of crimping tool 140. Aligned with each slot 316 on lower shelf 312 is housing 320 for receiving a lower end of crimping tool 140. Each crimping tool 140 is locked with a slot 316 by a brace 322 that spans across the slot.

As will be apparent to one skilled in the art, various modifications can be made within the scope of the aforesaid description. Such modifications being within the ability of one skilled in the art form a part of the present invention and are embraced by the claims below.

I claim:

1. An assembly for configuring a hose for connection to and between a first apparatus and a second apparatus, the assembly comprising:
 a medical gas outlet rough-in configured for coupling to
  a first end of the hose and the first apparatus and a medical gas nut nipple configured for coupling to a second end of the hose and the second apparatus, wherein the medical gas outlet rough-in includes a base and a stem extending radially out from and fluidly coupled with the base, the stem including a first ribbed section having a plurality of first radial valleys defined between first radial ribs, and the medical gas nut nipple includes a nut portion and a second ribbed section extending axially from the nut portion, the second ribbed section having a plurality of second radial valleys defined between second radial ribs, a first die configured for coupling the medical gas outlet rough-in to a first end of the hose, the first die including a first stop and a first channel extending through the first stop, the first channel having a first diameter and a first ribbed section including a plurality of first ribs, each of the first ribs including a first rib height, and a second die configured for coupling the medical gas nut nipple to a second end of the hose, the second die including a second stop and a second channel extending through the second stop, the second channel having a second diameter and a second ribbed section including a plurality of second ribs, each of the second ribs including a second rib height, a first length extending to and between the first stop and a tip of a first rib of the plurality of first ribs of the first die that is nearest to the first stop, and a second length extending to and between an intersection of the base with the stem and a bottom of a first radial valley of the first ribbed section of the stem, the first length being equal to the second length, wherein, when the stem of the medical gas outlet rough-in is fully inserted through the first stop and into the first channel of the first die, the first stop directly contacts the base with the plurality of first ribs of the first die being radially aligned with the plurality of first radial valleys of the stem of the medical gas outlet rough-in, and wherein, when the second ribbed section of the medical gas nut nipple is fully inserted through the second stop and into the second channel of the second die, the second stop directly contacts the nut portion with the plurality of second ribs of the second die being radially aligned with the plurality of second radial valleys of the second ribbed section.

2. The assembly of claim 1 wherein the first channel includes a diameter that is the same as a diameter of the second channel.

3. The assembly of claim 1 wherein the first rib height is the same and the second rib height.

4. The assembly of claim 1 wherein the nut nipple has a third stop opposite the second stop.

5. The assembly of claim 4 wherein, when the second ribbed section of the medical gas nut nipple is fully inserted through the third stop and into the second channel of the second die, the third stop directly contacts the nut portion with the plurality of second ribs of the second die being radially aligned with the plurality of second radial valleys of the second ribbed section.

6. The assembly of claim 1 wherein each of the first die and the second die is divided into two halves.

7. The assembly of claim 1 wherein the first die is operatively seated within a hand-held crimping tool.

8. The assembly of claim 7 wherein the hand-held crimping tool is battery powered.

9. An assembly for configuring a hose for connection to and between a first apparatus and a second apparatus, the assembly comprising:

a first coupling configured for attaching to a first end of a hose and the first apparatus, and a second coupling configured for attaching to a second end of the hose and the second apparatus, wherein the first coupling includes a stem extending radially out from a base, the stem including a first ribbed section having a plurality of first radial valleys defined between first radial ribs, and the second coupling includes a nut portion and a second ribbed section extending from the nut portion, the second ribbed section having a plurality of second radial valleys defined between second radial ribs, a first die including a first stop and a first channel, the first channel having a first ribbed section including a plurality of first ribs, and a second die including a second stop and a second channel, the second channel having a second ribbed section including a plurality of second ribs, a first length extending to and between the first stop and a tip of a first rib of the plurality of first ribs of the first die that is nearest to the first stop, and a second length extending to and between an intersection of the base with the stem and a bottom of a first radial valley of the first ribbed section of the stem, the first length being equal to the second length, wherein, when the stem of the first coupling is fully inserted through the first stop and into the first channel of the first die, the first stop directly contacts the base with the plurality of first ribs of the first die being radially aligned with the plurality of first radial valleys of the stem, and wherein, when the second ribbed section of the second coupling is fully inserted through the second stop and into the second channel of the second die, the second stop directly contacts the nut portion with the plurality of second ribs of the second die being radially aligned with the plurality of second radial valleys of the second ribbed section.

10. The assembly of claim 9 wherein the first channel includes a diameter that is the same as a diameter of the second channel.

11. The assembly of claim 9 wherein the second coupling has a third stop opposite the second stop and, when the second ribbed section of the second coupling is fully inserted through the third stop and into the second channel of the second die, the third stop directly contacts the nut portion with the plurality of second ribs of the second die being radially aligned with the plurality of second radial valleys of the second ribbed section.

12. The assembly of claim 9 wherein the second die is operatively seated within a battery powered, hand-held crimping tool.

13. An assembly for configuring a hose for connection to and between a first apparatus and a second apparatus, the assembly comprising:

a medical gas outlet rough-in configured for coupling to a first end of the hose and the first apparatus and a medical gas nut nipple configured for coupling to a second end of the hose and the second apparatus, wherein the medical gas outlet rough-in includes a base and a stem extending radially out from and fluidly coupled with the base, the stem including a first ribbed section having a plurality of first radial valleys defined between first radial ribs, and the medical gas nut nipple includes a nut portion and a second ribbed section extending axially from the nut portion, the second ribbed section having a plurality of second radial valleys defined between second radial ribs, a first die configured for coupling the medical gas outlet rough-in to a first end of the hose, the first die including a first stop and a first channel extending through the first stop, the first channel having a first diameter and a first ribbed section including a plurality of first ribs, each of the first ribs including a first rib height, and a second die configured for coupling the medical gas nut nipple to a second end of the hose, the second die including a second stop and a second channel extending through the second stop, the second channel having a second diameter and a second ribbed section including a plurality of second ribs, each of the second ribs including a second rib height.

14. The assembly of claim 13, wherein, when the stem of the medical gas outlet rough-in is fully inserted through the first stop and into the first channel of the first die, the first stop directly contacts the base with the plurality of first ribs of the first die being radially aligned with the plurality of first radial valleys of the stem of the medical gas outlet rough-in.

15. The assembly of claim 13, wherein, when the second ribbed section of the medical gas nut nipple is fully inserted through the second stop and into the second channel of the second die, the second stop directly contacts the nut portion with the plurality of second ribs of the second die being radially aligned with the plurality of second radial valleys of the second ribbed section.

16. The assembly of claim 13, including a first length extending to and between the first stop and a tip of a first rib of the plurality of first ribs of the first die that is nearest to the first stop, and a second length extending to and between an intersection of the base with the stem and a bottom of a first radial valley of the first ribbed section of the stem, the first length being equal to the second length.

17. The assembly of claim 13, wherein the first channel includes a diameter that is the same as a diameter of the second channel.

18. The assembly of claim 13, wherein the first rib height is the same and the second rib height.

19. The assembly of claim 13, wherein the first apparatus is a vacuum source.

20. The assembly of claim 13 wherein the first apparatus is a source of gas.

* * * * *